US010611654B2

(12) United States Patent
Goldhardt et al.

(10) Patent No.: US 10,611,654 B2
(45) Date of Patent: Apr. 7, 2020

(54) MUNICIPAL MIXING WITH RECIPROCATING MOTION DISK

(71) Applicant: Ovivo Inc., Montreal (CA)

(72) Inventors: James Goldhardt, Magna, UT (US); Haydon Christiansen, Sandy, UT (US)

(73) Assignee: Ovivo Inc., Montréal (CA)

( * ) Notice: Subject to any disclaimer, the term of this patent is extended or adjusted under 35 U.S.C. 154(b) by 0 days.

(21) Appl. No.: 16/169,692

(22) Filed: Oct. 24, 2018

(65) Prior Publication Data

US 2019/0185354 A1 Jun. 20, 2019

Related U.S. Application Data

(63) Continuation of application No. 15/448,499, filed on Mar. 2, 2017, now abandoned.

(60) Provisional application No. 62/304,042, filed on Mar. 4, 2016.

(51) Int. Cl.
*C02F 3/28* (2006.01)
*B01F 11/00* (2006.01)
*C02F 11/04* (2006.01)

(52) U.S. Cl.
CPC ............ *C02F 3/28* (2013.01); *B01F 11/0082* (2013.01); *B01F 2215/0052* (2013.01); *B01F 2215/0431* (2013.01); *B01F 2215/0454* (2013.01); *B01F 2215/0481* (2013.01); *C02F 11/04* (2013.01)

(58) Field of Classification Search
CPC ........ C02F 3/28; C02F 11/04; B01F 11/0082; B01F 2215/0052; B01F 2215/0431; B01F 2215/0454; B01F 2215/0481
See application file for complete search history.

(56) References Cited

U.S. PATENT DOCUMENTS

| | | | | |
|---|---|---|---|---|
| 2,460,004 A * | 1/1949 | Keene | ................. | B01F 3/0473 261/82 |
| 5,100,242 A * | 3/1992 | Latto | .................. | B01F 11/0082 366/118 |
| 6,007,237 A * | 12/1999 | Latto | .................. | B01F 11/0082 366/315 |
| 6,830,369 B2 * | 12/2004 | Haughton | .......... | B01F 11/0082 366/316 |
| 7,029,166 B2 * | 4/2006 | Haughton | .......... | B01F 11/0082 366/316 |
| 7,278,781 B2 * | 10/2007 | Haughton | .......... | B01F 11/0082 366/316 |
| 7,364,351 B2 * | 4/2008 | Haughton | .......... | B01F 11/0082 366/316 |
| 7,399,112 B2 * | 7/2008 | Haughton | .......... | B01F 11/0082 366/258 |
| 7,685,896 B2 * | 3/2010 | Haughton | .......... | B01F 11/0082 366/258 |
| 2015/0182927 A1 * | 7/2015 | Haughton | .......... | B01F 11/0082 366/203 |

FOREIGN PATENT DOCUMENTS

WO    WO-2004045753 A1 *  6/2004  ......... B01F 11/0082

* cited by examiner

*Primary Examiner* — Tony G Soohoo
(74) *Attorney, Agent, or Firm* — Thomas M. Freiburger

(57) ABSTRACT

A reciprocating motion disk for mixing wastewater in a tank of a treatment plan is optimized for geometry, along with cycling speed and stroke length, to cause effective mixing velocity throughout the tank.

10 Claims, 2 Drawing Sheets

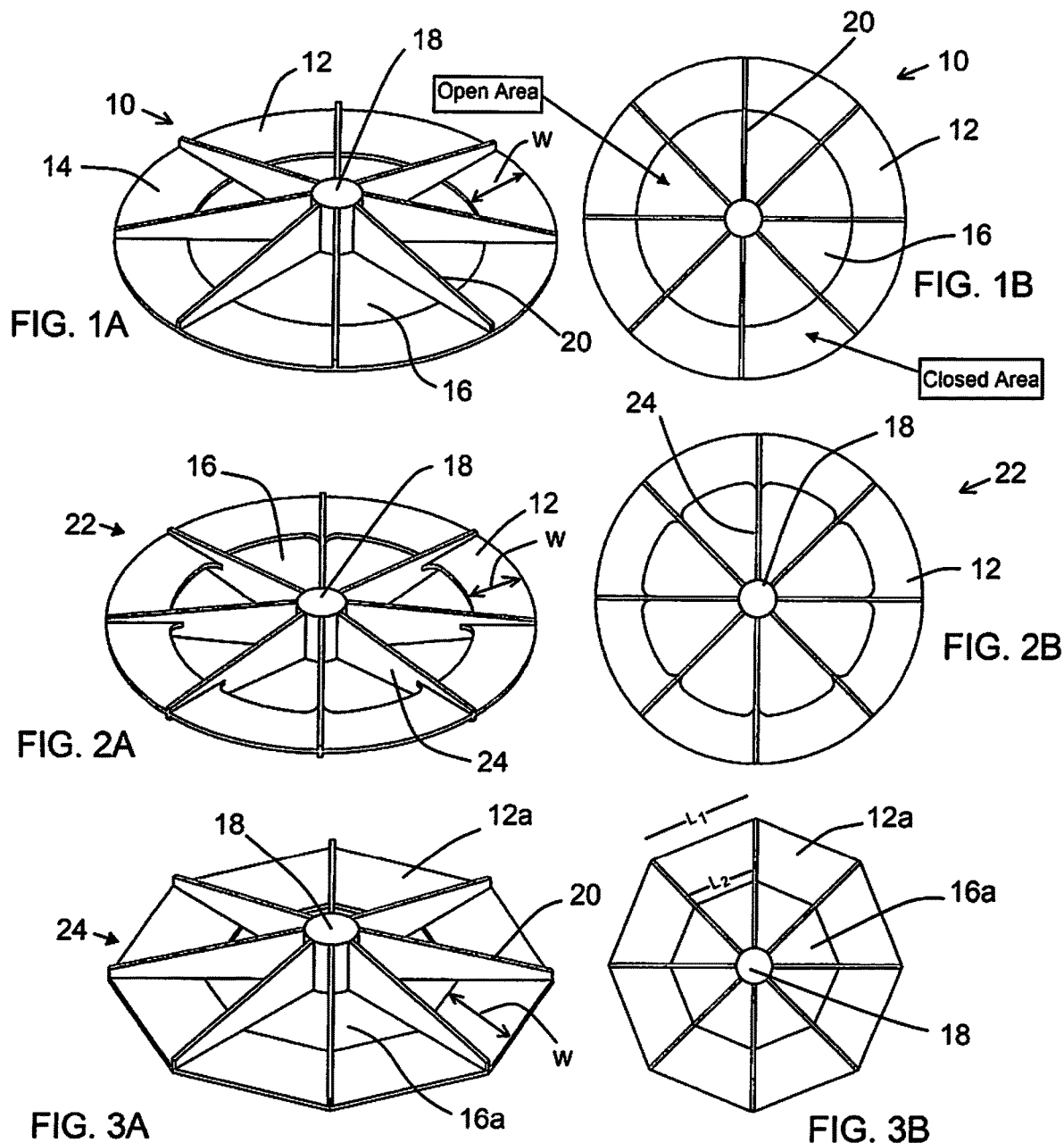

SECTION A-A

MUNICIPAL MIXING WITH RECIPROCATING MOTION DISK

This application is a continuation of application Ser. No. 15/448,499, filed Mar. 2, 2017, now abandoned, which claimed benefit of provisional application No. 62/304,042, filed Mar. 4, 2016.

BACKGROUND OF THE INVENTION

This invention is concerned with efficient mixing of liquids and slurries using a reciprocating motion to oscillate a mixing disk. In particular the invention is directed to increasing mixing performance and efficiency with optimized geometry in a mixing disk in a reciprocating mixer. An important application of the invention is in wastewater treatment, in the mixing of wastewater slurries, especially in digesters, such as anaerobic digesters.

Linear motion mixers, i.e. reciprocating motion mixers, are described in U.S. Pat. Nos. 7,685,896, 7,399,112, 7,364,351, 7,278,781, 7,029,166, 6,830,369, 6,007,237, 5,100,242 and 5,052,813, as well as U.S. Pub. No. 2015/182927. These mixers, at least in the context of the current invention, typically are used in very large vessels, such as, for example, a mixing disk of six feet operating in a vessel about 50 feet in diameter. The vessel or tank can be much larger.

As discussed in some of the above patents and publication, several recognize the mixing disk geometry as having an effect on the efficiency and performance of the reciprocating mixer disk. Some of the patents, such as U.S. Pat. Nos. 6,830,369 and 7,685,896, provide a formula for a target range of effectiveness, the formula including, effectively, the ratio of the overall circular area defined by the entire disk to the open area at the center of the disk, wherein stroke length and cycle duration are also considered in the formula.

SUMMARY OF THE INVENTION

According to the current invention, it has been discovered that optimum ratios of the areas of the disk should be different from what is taught in the prior art, especially for use in municipal wastewater treatment applications including anaerobic digesters, aerobic digesters, holding tanks, and other treatment tanks and vessels.

The mixing disk is essentially a flat annular plate, circular or polygonal in shape surrounding an open central area ("open area"), with the annulus of the ring having a specific "footprint" or closed area, designed to produce a high velocity flow through the open area during linear reciprocating travel of the mixing disk. If the open area is too large relative to the closed area (also considering stroke length and frequency), fluid velocity through open area can be too low for effective mixing. In an ideal design that center fluid velocity and flow rate are maximized.

Whether the annular ring of closed area surrounding the open area is planar or formed with a cone angle, it is the projected area of the disk or closed area that is important in considering optimum mixing performance. The following equation is followed for optimizing disk parameters, where CPM is frequency in cycles per minute, $A_{closed}$ is the closed area of the disk, and $A_{open}$ is open area at the center of the disk:

$$\text{CPM} \times \text{stroke length} \times (A_{closed} + A_{open})/A_{open},$$

the resultant mathematical value being greater than 1527 and less than 8750, or more broadly, between about 1530 and about 8750.

Typically in municipal sewage treatment operations, the stroke length, i.e. the distance traveled from the topmost position to the bottommost position of the mixing disk, will be in the range of 6 inches to 24 inches. Typically the frequency will be in the range of about 25 to 35 CPM. A typical overall diameter of the mixer disk can be about four or six feet to eight feet.

Since the ratio in the above formula is a ratio of areas, the same ratio can be obtained by the quotient of the square of the outer diameter of the disk and the square of the inner diameter of the annular closed area. This assumes the area of the shaft hub and the radial spokes, which is minimal, is disregarded and simply counted as part of open area. For greater accuracy, the hub and spokes area can be factored into the calculation of the open area, i.e. subtracted out, which will shift the number range somewhat. The claims herein assume the hub and spokes area is not subtracted out.

The same formula and optimal range is applicable for non-circular mixer disk shapes, such as polygonal, as well as circular. The term essentially circular may be used herein, with the intention of including polygonal shapes, such as pentagonal, hexagonal, octagonal, etc. The term also includes non-circular round shapes such as elliptical.

The invention thus optimizes the performance of a linear motion reciprocating mixing disk, using the parameters developed according to the invention for application to any type of shaped, open-center reciprocal mixer disk. These and other objects, advantages and features of the invention will be apparent from the following description of a preferred embodiment, considered along with the accompanying drawings.

DESCRIPTION OF THE DRAWINGS

FIG. 1A is a perspective view showing one example of a reciprocating mixer disk geometry.

FIG. 1B is a plan view of the same disk.

FIGS. 2A and 2B are perspective and plan views showing another disk geometry.

FIGS. 3A and 3B are perspective and plan views showing another mixing disk, with a polygonal shape.

DESCRIPTION OF PREFERRED EMBODIMENTS

Figure 6:
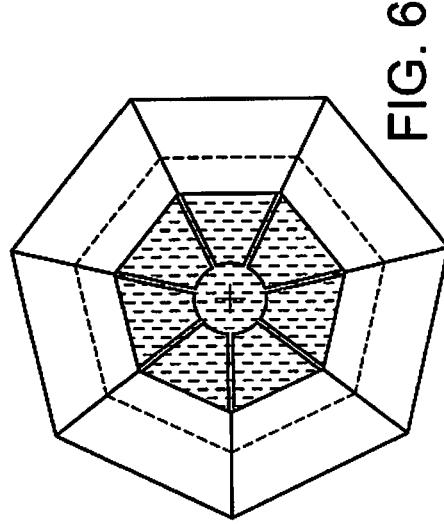
FIGS. 5-8 are schematic plan views showing a polygonal disk and identifying areas of the disk that can be involved in calculations regarding disk geometry.
Figure 8:
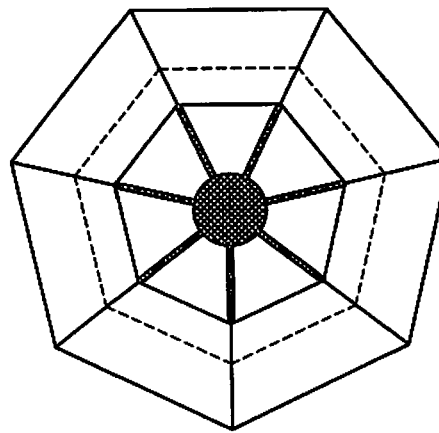
Figure 5:
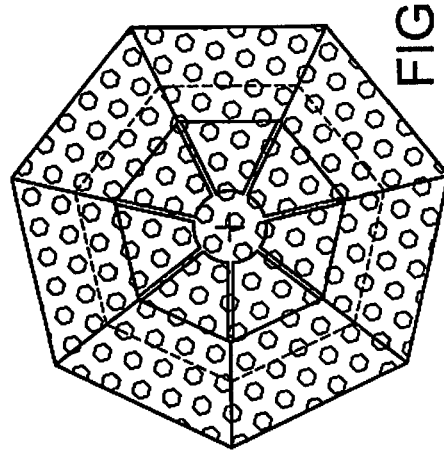

The drawings illustrate several different general configurations of reciprocating mixer disk to which the principles of the invention can be applied. FIGS. 1A and 1B show one pattern in the form of a mixing disk 10 comprised of an annular ring 12 of closed area that is shown flat, planar but which could be conical if desired, as in some mixer disks of the prior art. The flat ring 12 has outer and inner radii, $R_o$ and $R_i$ respectively, defining a width, $W_{disk} = R_o - R_i$, closed area 14 (references to closed area herein include only the ring 12). In the center is an open area 16. If the solid ring 12 is sloped, in a conical shape, it is the projected area that is important to the invention, that is, the area that would be seen as the closed area 12 in plan view, such as seen in FIG. 1B.

The mixing disk has a hub 18 to which a reciprocating mixer shaft is attached concentrically, secured into either the hub side seen in FIG. 1A or the opposite side. A series of spokes or struts 20, eight of which are shown in the examples here, secure the closed-area ring 12 to the hub 18. The mixing disk 10, for most purposes according to the invention, is of a large diameter, e.g. four or six feet to seven or eight feet, and can be formed of stainless steel or other corrosion-resistant metal, such as painted steel.

FIGS. 2A and 2B show another design of a mixing disk 22, similar to that of FIG. 1A but with struts 24 secured to the annular disk 12 in a different way, in which the end of each strut is forked with a slot, fitting closely over the thickness of the ring 12. The struts can be welded or otherwise securely affixed to the disk.

FIGS. 3A and 3B show a different design wherein the closed area annular mixing disk 12a is polygonal rather than circular, in this case octagonal. The formula for optimum area applies no matter the shape selected, so long as a closed generally ring-shaped area surrounds an open central area. Here, as seen in FIG. 3B, the closed area 12a is defined by eight trapezoid shapes. The area of each segment is defined by the width, $W_{disk}$, times the average length of major sides, shown as $L_1$ for the outer length and $L_2$ for the inner length of the segment. This area can also be calculated using the radii $R_o$ and $R_i$ and the number of sides, which defines the segment angle involved. The open area 16a of the polygonal mixer disk 24 is simply calculated as the area of an octagon (in this example), made up of eight triangles. The spokes 20 may or may not be included, as explained further below. The hub 18 area may also be included or not as discussed below.

In all these different geometries, the sum of the projected closed area and the open area is divided by the open area to form the ratio of interest, basically the ratio of the entire area within the disk's outer diameter, to the open area, or area of the circle or polygon inward of the closed annular ring. This ratio is multiplied by frequency in CPM and stroke length in inches.

As noted above, the numerical value resulting from this calculation should be in the range of about 1530 to about 8750. This results in a mixer disk design with a greater ratio of projected closed area to total, overall area, as compared to mixer disks of the prior art.

More specifically, the above design number is preferably between about 2000 to 5000, and more preferably, one mixer disk design has the above numerical value in the range of about 2400 to about 3750. As an example, this would correspond to a circular mixer disk reciprocating at 30 CPM with a stroke of 20 inches, and a ratio of outer disk radius, $R_o$ to inner ring radius $R_i$ of 2.0 to 2.5 (ratio of squares being 4.0 to 6.25).

Testing was conducted in a liquid-filled tank, with mixing disks reciprocated in the tank as stated above, and with $R_o/R_i$ ratios in a range between 1.5 and 2.5. Average velocities of liquid movement were measured within the tank, and it was found that for velocities of one inch per second, two inches per second, and three inches per second, a strong correlation was found between the percentage of tank volume being at each of these average velocities and the ratio of outer radius $R_o$ to inner radius $R_i$. Ratios of 2.0 to 2.5 (squared range 4.0 to 6.25) were found very effective, with radius ratios of 2.2 to 2.3 being most effective. The ratio range of 2.0 to 2.25 corresponds to a range of 2904 to 3038 for the calculated design factor number described above.

FIGS. 4 through 8 are diagrams showing disk geometry factors and relationships of various areas. The following definitions apply in those drawings:

Velocity Definitions:
VM=maximum disk velocity
VU=disk velocity upper limit=e.g. 43.982 in/s (24" stroke @ 35 CPM)
VL=disk velocity lower limit=e.g. 7.854 in/s (6" stroke @ 25 CPM)
VM range (VL≤VM≤VU)

Polygon Definitions:
n=(number of equal length sides)
$R_i$=inner perpendicular distance from polygon center to side
$R_o$=outer perpendicular distance from polygon center to side
$R_x$=x perpendicular distance from polygon center to side
$X_f$=disk width displacement factor (0.20≤xf≤0.40)

Area Definitions:
$A_{hs}$=area occupied by hub and spokes
$A_{open}$ (area open)=$A_i - A_{hs}$
$A_{closed}$ (area closed)=$A_o - A_i$
$A_x$=(area displaced thru $A_{open}$)
$A_{do}$ (area displaced away from $A_{open}$)=$A_o - A_x$
$A_f = A_{open}/A_x$ (0.35≤af≤0.65), broadly 0.25 to 0.75

In the example below the number of polygonal sides is assumed at one million, i.e. essentially infinite, in effect circular. Dimensions are assumed for the purpose of this example. In the example the area occupied by the disk hub and spokes $A_{hs}$ is subtracted out of the full area within the inner polygon to calculate the true open area. However, all of this hub and spokes area can be ignored, as noted above, and as assumed relative to the claims. That is, the open area can be more approximately calculated by simply using the entire polygonal or circular area inward of the solid annulus.

CALCULATING DISK GEOMETRY - OPEN AREA METHOD

| | |
|---|---|
| n := 1000000 | number of equal length polygon sides (3 ≤ n ≤ ∞) when n = ∞ the disk is circular in shape |
| $R_i$ := 22 · in | inner distance from polygon center to side |
| $R_o$ := 42 · in | outer distance from polygon center to side |
| $A_{hs}$ := 176.715 in² | area occupied by disk hub and spokes |
| $W_{disk}$ := $R_o - R_i$ = 20 · in | disk width between inner and outer polygons |
| $A_i := n \cdot R_i^2 \cdot \tan(\frac{\pi}{n}) = 1520.53$ in² | area inner polygon |
| $A_o := n \cdot R_o^2 \cdot \tan(\frac{\pi}{n}) = 5541.77$ in² | area outer polygon |
| $A_{open} := A_i - A_{hs} = 1343.82$ in² | open area allowing fluid passage |
| $A_{closed} := A_o - A_i = 4021.21$ in² | closed area displacing fluid |
| $a_f := 0.559$   $0.35 \le a_f \le 0.65$ | disk area displaced thru open area factor range |
| $A_x := \frac{A_{open}}{a_f} = 2.404 \times 10^3 \cdot$ in² | area displaced thru open area |
| $R_x := \sqrt{A_x \cdot (n \cdot \tan(\frac{\pi}{n}))^{-1}} = 27.66$ in | displaced distance from polygon center to side |

Figure 7:
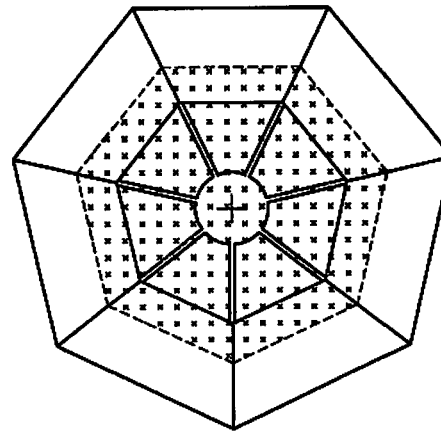
Figure 4:
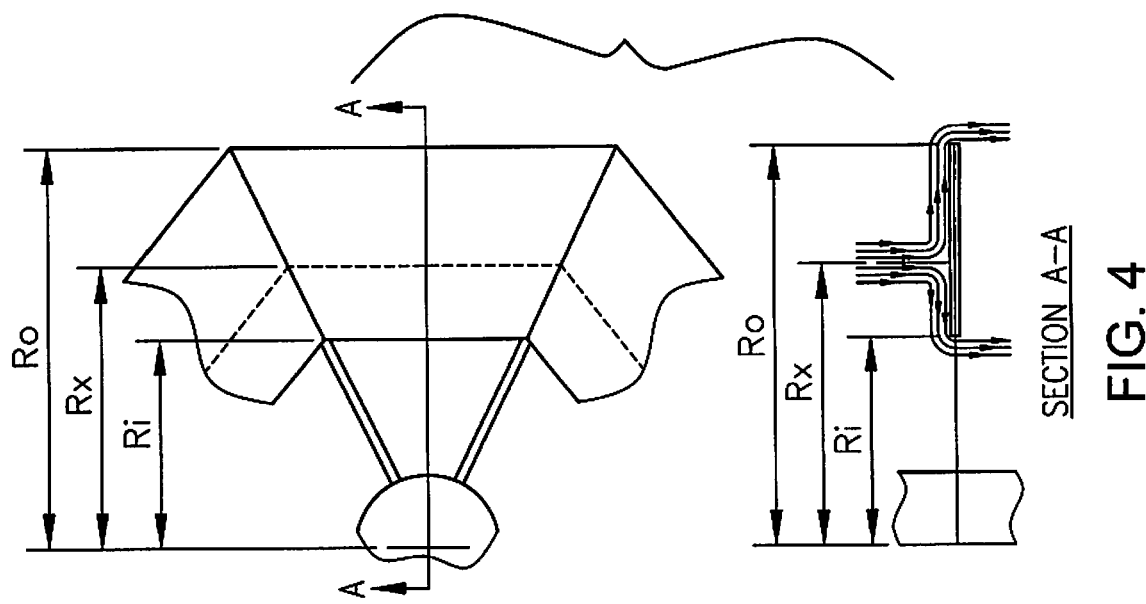
FIG. 4 is a diagram with plan and section views showing disk geometry factors, i.e. dimensions.

CALCULATING DISK GEOMETRY - OPEN AREA METHOD $A_{do} := A_o - A_x = 3137.81 \text{ in}^2$     area displaced away from open area
$X := R_x - R_i = 5.662 \text{ in}$     offset distance from inner polygon $x_f := \dfrac{X}{W_{disk}} = 0.83 \quad 0.20 \leq x_f \leq 0.40$     approximate disk width displacement factor range $A_{i\_infinite\_sides} := \pi \cdot R_i^2 = 1520.53 \text{ in}^2$     area outer polygon with infinite sides (circular)
$A_{o\_infinite\_sides} := \pi \cdot R_o^2 = 5541.77 \text{ in}^2$     area inner polygon with infinite sides (circular)
$A_{x\_infinite\_sides} := \pi \cdot R_x^2 = 2403.96 \text{ in}^2$     area displaced with infinite sides (circular) thru open area
$A_{open} = 1.344 \times 10^3 \cdot \text{in}^2$     $A_x - A_{open} = 1.06 \times 10^3 \cdot \text{in}^2$     $A_{closed} = 1.617 \times 10^3 \cdot \text{in}^2$ FIG. 7, as well as FIG. 4, demonstrates the effect of the disk moving through liquid. As the disk moves, the volume of liquid directly in the path of the disk annulus is divided between that which enters the opening (along with liquid in the path of the opening) and liquid that flows outwardly, to clear the outer edge of the disk. The sectional view in FIG. 4 shows this, as does the plan view, and denotes the radius from center to the division point as $R_x$. This is the displaced distance from the polygon center. Similarly, $A_x$ is the area displaced through the open area of the disk, as denoted in FIG. 7. The value of $R_x$ is dependent on disk velocity.

The formulas and sample calculations above reflect that the behavior of liquid flow and liquid velocity in the tank induced by the movement of the disk is relatively complex. However, the formula given above, which involves CPM, stroke length, area enclosed and area open, and the ranges given for the resulting number calculated, are effective if the area occupied by the hub and spokes is simply ignored. That is, open area is simply considered as the full area defined within the inner part $R_i$ of the disk.

As noted above, the velocity of movement of the disk has an effect on how much liquid in the disk's path is drawn into and through the opening, i.e. area $A_x$. The factor $A_f$ is defined as $A_{open}/A_x$, and preferably is in the range of 0.25 to 0.75, more preferably 0.35 to 0.65. Typically $A_f$ will be about 0.5, plus or minus 10%.

Linear motion reciprocating mixers with mixing disk meeting the above criteria produce a high velocity through the central opening and mix liquids such as municipal wastewater treatment sludge (particularly in anaerobic digestion) more efficiently than with prior art mixing disks. It should be understood, however, that the invention applies to mixing disks for other liquids and slurries as well, in a wide range of viscosities and densities.

The above described preferred embodiments are intended to illustrate the principles of the invention, but not to limit its scope. Other embodiments and variations to these preferred embodiments will be apparent to those skilled in the art and may be made without departing from the spirit and scope of the invention.

We claim:

1. In a wastewater treatment system, a method for mixing liquids or slurries in a wastewater treatment tank, comprising:

providing in the wastewater treatment tank a reciprocating mixer disk for mixing the liquids or slurries by cyclical up and down motion of the mixer disk within the tank, the mixer disk comprising a polygonal or essentially circular solid ring with an outer diameter and an inner diameter, the inner diameter of the ring defining a central essentially open area $A_{open}$, the solid ring having a closed area $A_{closed}$, and the mixer disk having essentially radial struts supporting the solid ring, extending from the solid ring inwardly to a central hub, the solid ring having a width from the outer diameter to the inner diameter, reciprocating the mixer disc in up and down motion at a cycle rate of C cycles per minute, at a stroke length S in inches, and the product of $C \times S \times (A_{open} + A_{closed})/A_{open}$ being in the range of 1530 to 8750.

2. The method of claim 1, wherein said product is in the range of 2000 to about 5000.

3. The method of claim 1, wherein said product is in the range of 2400 to about 3750.

4. The method of claim 1, wherein said outer diameter and said inner diameter of the solid ring define a ratio in a range of 2.0 to 2.5.

5. The method of claim 4, in which the outer diameter and said inner diameter of the solid ring define a ratio in a range of 2.2 to 2.3.

6. The method of claim 1, wherein the disk is operated in reciprocating vertical motion at a peak disk speed in the range of 3 to 5 feet per second.

7. The method of claim 1, wherein a factor $A_f$ is in a range of 0.25 to 0.75, where $A_f = A_{open}/A_x$, and $A_x$ is the area of liquid displaced inwardly to the open area as the disk is advanced.

8. The method of claim 7, wherein the factor $A_f$ is in a range of 0.35 to 0.65.

9. The method of claim 7, wherein the factor $A_f$ is about 0.5.

10. The method of claim 1, wherein the disk is operated in reciprocating vertical motion at a peak disk speed in the range of 2 to 6 feet per second.

* * * * *